(12) United States Patent
Bhargava et al.

(10) Patent No.: US 8,082,349 B1
(45) Date of Patent: Dec. 20, 2011

(54) FRAUD PROTECTION USING BUSINESS PROCESS-BASED CUSTOMER INTENT ANALYSIS

(75) Inventors: Sunil Bhargava, Hillsborough, CA (US); Ben Feldman, El Cerrito, CA (US); Roger Faulkner, San Jose, CA (US); Peter Relan, Atherton, CA (US)

(73) Assignee: Entrust, Inc., Ottawa, ON (CA)

( * ) Notice: Subject to any disclaimer, the term of this patent is extended or adjusted under 35 U.S.C. 154(b) by 1261 days.

(21) Appl. No.: 11/582,739

(22) Filed: Oct. 17, 2006

Related U.S. Application Data (60) Provisional application No. 60/729,435, filed on Oct. 21, 2005, provisional application No. 60/728,921, filed on Oct. 21, 2005.

(51) Int. Cl.
*G06F 15/16* (2006.01)
(52) U.S. Cl. .................. 709/227; 709/203; 709/217
(58) Field of Classification Search .................. 709/203, 709/217, 227
See application file for complete search history.

(56) References Cited

U.S. PATENT DOCUMENTS

| | | | |
|---|---|---|---|
| 5,720,033 A | 2/1998 | Deo | |
| 6,094,643 A * | 7/2000 | Anderson et al. | 705/44 |
| 6,157,707 A | 12/2000 | Baulier et al. | |
| 6,163,604 A * | 12/2000 | Baulier et al. | 379/189 |
| 6,178,511 B1 | 1/2001 | Cohen et al. | |
| 6,279,113 B1 | 8/2001 | Vaidya | |
| 6,327,677 B1 | 12/2001 | Garg et al. | |
| 6,363,411 B1 | 3/2002 | Dugan et al. | |
| 6,647,400 B1 | 11/2003 | Moran | |
| 6,965,868 B1 | 11/2005 | Bednarek | |
| 7,032,114 B1 | 4/2006 | Moran | |
| 7,065,657 B1 | 6/2006 | Moran | |
| 7,089,592 B2 * | 8/2006 | Adjaoute | |
| 7,107,285 B2 | 9/2006 | Von Kaenel et al. | |
| 7,373,524 B2 * | 5/2008 | Motsinger et al. | |
| 7,379,882 B2 | 5/2008 | Adams et al. | |
| 7,496,670 B1 * | 2/2009 | Givoly | |
| 7,624,174 B2 * | 11/2009 | Sanghvi | |
| 7,716,487 B2 * | 5/2010 | Venkatesan et al. | |
| 7,739,499 B2 * | 6/2010 | Ramirez et al. | |
| 2001/0034717 A1 * | 10/2001 | Whitworth | |
| 2002/0038228 A1 | 3/2002 | Waldorf et al. | |
| 2002/0100036 A1 * | 7/2002 | Moshir et al. | |
| 2003/0229519 A1 * | 12/2003 | Eidex et al. | |

(Continued)

FOREIGN PATENT DOCUMENTS

EP 001408439 A1 4/2004

*Primary Examiner* — Phuoc Nguyen
(74) *Attorney, Agent, or Firm* — Hickman Palermo Truong & Becker LLP (57) ABSTRACT

Online fraud is reduced by identifying suspicious activities in real time and providing alerting so that interdiction may be performed. Historical customer behavior is used to identify and flag deviations in activity patterns. An HTTP data stream is parsed, intelligently filtered, and key data is extracted in real time. The key data is periodically extracted from network traffic and used to update corresponding summaries stored in a fraud data mart. The data mart is constantly incrementally updated so that the most current historical information is available to a rules engine for real time comparison with new customer data and patterns occurring on the network. Fraud-related business signatures are applied to this data stream and/or a data mart to identify suspicious online transactions. By understanding the customer session, the customer's intended use of the online application is derived and possible fraudulent activities identified.

22 Claims, 3 Drawing Sheets

U.S. PATENT DOCUMENTS

2004/0117358 A1 6/2004 Von Kaenel et al.
2004/0186999 A1* 9/2004 Kim et al.
2004/0237077 A1 11/2004 Cole et al.
2004/0260602 A1 12/2004 Nakaminami et al.
2005/0060157 A1* 3/2005 Daugherty et al.
2005/0091524 A1* 4/2005 Abe et al.
2006/0015733 A1* 1/2006 O'Malley et al.

* cited by examiner

FRAUD PROTECTION USING BUSINESS PROCESS-BASED CUSTOMER INTENT ANALYSIS

CROSS REFERENCE TO RELATED APPLICATIONS

This application claims the benefit of domestic priority to U.S. Provisional Patent Application No. 60/729,435 filed on Oct. 21, 2005 and entitled "Fraud Detection-Customer Intent Business Process" and claims the benefit of domestic priority to U.S. Provisional Patent Application No. 60/728,921 filed on Oct. 21, 2005 and entitled "Fraud Detection-Customer Intent Analysis"; the entire content of both of which are incorporated by this reference in their entirety for all purposes as if fully disclosed herein.

FIELD OF THE INVENTION

The present invention relates generally to online fraud protection and, more specifically, to analysis of a customer's intent based on monitoring of web-enabled business processes.

BACKGROUND

More and more business processes are executed by software applications being developed and deployed in communications networks. These "network-enabled applications" are typically installed on some form of computing hardware connected to a network, such as application servers on the Internet. Such application servers provide a platform for deploying, executing, and managing sessions with the applications. Once deployed, customers can initiate client-server sessions with the applications whereby the customers and applications communicate over the network to conduct some type of business offered by the application. The services provided to customers by an application are referred to as "business services" and have one or more underlying business processes. Business processes are composed of various "business activities" that are performed in association with business processes that embody the business services. Business activities are performed in the context of conducting some type of business between customers and the application's owner (referred to herein simply as a "business").

Because more and more financial and retail activity is conducted online, losses due to fraud are on the rise and businesses urgently need to take steps to detect and reduce fraudulent activity. The Internet has also made customers faceless and, therefore, difficult to support in a personalized way. The commercial strength of the Internet, i.e., access to a large and diverse audience without the need for a local presence, is also a weakness. In the real world, you can learn over time the idiosyncrasies of individual customers and observe their behavior to understand their intent. This is not readily possible in online Internet transactions, where customers are remote and cannot be directly observed. Lacking the visual and verbal clues taken for granted in the physical world, companies have not been able to monitor the activity of individual customers in real time, or respond to such activities in real time. Thus, a host of criminal activities, including fraudulent purchases and financial transactions, identify theft, "phishing", etc. are now based on online transactions. Detecting and preventing these activities is a significant priority for businesses with online operations.

Approaches to online fraud protection have typically relied on invasive practices of inserting fraud detection logic directly into online applications which, therefore, affects customers' experiences with such applications. Since fraud detection formulas are in constant need of refinement and updating and tuning, this approach slows the deployment of business related online application refinements, drains critical resources away into maintenance activities, and impacts the ability of the online business to focus on core business activities. Also, since the technology and design of each online application is different, it is practically impossible to efficiently reuse or leverage fraud detection formulas developed for other applications or other similar businesses. Additionally, approaches to online fraud protection are often based on some form of post-processing analysis rather than on real time analysis of business processes and activities.

One primary challenge with application-independent real time monitoring and detection of suspicious activities is regarding the sheer volume of data involved in online activity. A typical e-commerce site may serve tens of thousands of customers an hour, generating gigabytes of data. Keeping track of this massive amount of data flowing through the network, identifying and extracting the information that has a potentially fraudulent intent, and making it available to the right people in real time, poses significant challenges.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

This application is related to U.S. patent application Ser. No. 10/952,599 filed Sep. 28, 2004 and entitled "Defining and Detecting Network Application Business Activities" (referred to herein as the "business signatures" reference); the entire content of which is incorporated by this reference in its entirety for all purposes as if fully disclosed herein.

Functional Overview of Embodiments

Online business activity fraud protection techniques described herein involve monitoring activities associated with network-enabled applications. Such activities and tasks are referred to herein as "business activities" in the sense that the activities are performed in the process of conducting business using applications. Business activities may be embodied in features provided or processes enabled by an application, such as "login" or "transfer funds." Each business activity of interest is associated with a unique "business signature" which can be used to identify the activity from streams or collections of monitored information, one approach to which is described in the business signatures reference. For example, a "login" business activity can be identified in an HTTP message between an application and a customer by detecting, in the HTTP message, the business signature corresponding to the activity. Web-enabled businesses typically use HTTP as an underlying transport protocol. Hence, business metrics can be tracked without intrusive application instrumentation, and these techniques provide non-invasive, application-independent fraud protection using standard HTTP (or other) traffic streams.

The fraud protection techniques help users reduce online fraud by identifying suspicious activity in real time, using fraud-related business signatures and fraud policies/rules, and providing active and informative alerting so that interdiction may be performed. Historical customer behavior is used to identify and flag deviations in activity patterns, e.g., in the context of the location at which customer transactions originate and the types of transactions conducted online. As an example, if a customer logs in from an unusual location relative to their past location profile, and performs a sensitive transaction inconsistent with their specific individual past behavior, the transaction and session can be flagged as suspicious and an alert can be generated.

The business signatures reference describes technology for monitoring and analyzing network traffic in real time and recognizing patterns. Such patterns are referred to as business signatures and comprise sets of conditions matched against the HTTP traffic that uniquely identify steps in an online business transaction. By focusing on these patterns, the web traffic that travels over the network can be effectively filtered so that the information most relevant to customer activity can be focused upon.

The online HTTP data stream is parsed, intelligently filtered, and key data extracted in real time, so that only the relevant data is stored. Each of the hits (application steps or pages accessed) recognized by a business signature are "sessionized", i.e., grouped with other hits from the same customer and/or customer session. By understanding the customer session, the customer's use or intended use of the online application is derived. Business signatures representing a suspicious activity, a set of fraud detection rules, and fraud detection processes are applied to this data stream and/or data store to identify suspicious online transactions. The key data is periodically extracted from network traffic streams (e.g., every few minutes or so) and used to immediately and incrementally update corresponding summaries stored in a fraud data mart. Hence, the fraud data mart is constantly updated so that the most current historical information is available to a rules engine, for real time comparison with new customer data and patterns occurring on the network, in order to recognize and extract more key data from business signature 'hits' at high volumes with relatively low storage requirements.

Using the fraud protection techniques described herein, owners of online services can, for non-limiting examples:

(a) reduce online fraud by identifying suspicious patterns of usage in real time, allowing for intervention;

(b) potentially prevent online fraud through true real-time interdiction capabilities;

(c) track, capture, and analyze customer sessions, both individually and en masse; and (d) diagnose problems in customer sessions down to individual customer issues.

Additionally, abnormal cross-session aggregate pattern metrics can cause alerts based on user definable thresholds. Dashboards provide for viewing general activity and suspicious activity metrics across all sessions occurring across a website. Users can then drill down into specific potentially fraudulent sessions or activities to view the details of the transaction, including the impact of the transaction based on the amount of value associated with the transaction (e.g., dollar amounts), form data, etc. Dashboards also enable users to compare activity ratios over time, as an additional tool to identify abnormal patterns in overall site activity. Analytic reports can be built on top of the fraud data mart to further identify patterns and tune the fraud-related business signatures.

Business Activities and Corresponding Business Signatures

Activities associated with network-enabled applications, and tasks performed by such applications or with such applications, are generally referred to herein as "business activities" in the sense that the activities are performed in the process of conducting business using network-enabled applications. Many business activities with network-enabled applications involve multiple underlying components or interactions with the application which, solely or collectively, can be associated with a unique "business signature." Business activities manifest in many forms, for non-limiting examples, (a) as a series of one or more steps in a business process; (b) as events or alarms issued by a network application, network management system or network component; (c) as application states or changes in state; (d) as states, or changes in state, of network infrastructure or computer hardware parameters, such as response time and CPU usage, respectively; and the like. In other words, a business signature can be associated with anything relating to interaction with a network-enabled application, in which the application owner (a business) is interested in observing.

A business signatures characterizes a corresponding business activity so that an occurrence of the activity can be detected and verified in real-time, i.e., substantially concurrent with the occurrence of the activity. In that sense, a business signature is a verifiable means for identifying a corresponding business activity.

Fraud-Related Business Signatures

A comprehensive approach to protecting against fraud in online transactions involves use of "parallel" processing of customer activity, business signatures, and session patterns to detect and interdict online fraudulent activity. Non-limiting examples of business signatures are related to the following.

Money Transfer: Unusual Frequency: customer makes an unusually large number of transfers in a short time.

Money Transfer: Customer transfers to a suspect or unusual destination account.

Money Transfer Customer transfers in an unusual amount from unknown location.

Money Transfer Suspect destination across many accounts, i.e., many customers transferring to the same destination account.

Money Transfer: Greater than 50% of balance.

Money Transfer Same customer/location logging on to many accounts (or attempting to logon).

Money Transfer: Unusual Navigation, i.e., there may be a pattern to how a customer typically accesses the website, such as always coming to the transfer money page from the account summary page. Detect a deviation from normal behavior.

Money Transfer: Unusual Pattern, e.g., the ratio of logins to money transfers over an hour are usually 40%, however during this hour they are 75%.

Money Transfer: Suspect Pattern, e.g., a customer makes a money transfer soon after adding a new third party payee and changing his email to a free email service.

Money Transfer: Suspect Pattern, e.g., many sessions in the hour add the same third party payee.

Account Management: Account Hijacking Pattern.

Account Management Suspect Address Change.

Account Management Suspect PIN Change.

Account Management Suspect e-Statement Request.

Account Management Many login attempts followed by PIN (password) change request.

Fraud Rules

Fraud rules are pre-defined formulas and/or processes for detecting potentially fraudulent activity in online application transaction activity, through examination of how a customer uses the network-enabled application and suspicious patterns of activity. A fraud rule comprises a set of one or more business signatures and parameters embodied in a policy, which is executed either (a) as specific web traffic patterns are recognized, or (b) on a time interval to scan historical customer sessions, or (c) in response to another rule. According to one embodiment, when the fraud rules detect a suspicious activity, a risk score or rating is also calculated and a record is made of that fraud event detection and an alert may be generated so that further action may be taken.

According to one embodiment, a suspicious activity may be detected by looking across a set of sessions for behavior that is atypical or is suspicious. The set of sessions typically share some commonality, i.e., (a) a customer's sessions over a period of time; (b) all customer sessions over a period of time, e.g., in the last hour; and (c) all customer sessions from a geography over a period of time, e.g., the last day, etc. With these sets of sessions, goals may include trying to determine if there is an atypical event and/or trying to determine if there is a pattern that is suspicious. For example, an atypical event may be deduced from a customer session in which there is a pattern to the customer's use of the website, e.g., the customer always comes to the transfer money page from the account summary page, or the ratio of logins to money transfers over an hour is usually 70%. For another example, a suspicious pattern may be deduced from a customer making a money transfer soon after adding a new payee and changing the account's email to a free web-based email domain, or many sessions in an hour adding the same payee.

Fraud rules can be defined and processed as consisting of "atoms" combined by "expressions", thus, allowing users to define and tailor complex rules without needing to be a programmer. According to one embodiment, a library of fraud rule templates is provided, which enables users to rapidly deploy the latest fraud detection formulas and procedures. Each fraud rule template in the library is parameterized so it can be easily adapted and tuned for a particular online environment and application. Fraud rule templates are provided so that a user can build relevant fraud rules for the user's particular business context and applications, without requiring programming. Thus, fraud rule templates embody generalized fraud detection methods, which can be configured to create a specific fraud rule instance. For example, a "Suspicious Activity—Single Session" template could be configured to look for both "change of email" and large "wire transfer" business signature matches in the same session, and that fraud rule instance could be named "Suspicious Wire Xfer w/Email Change" or the like. A rules editor provides validation and structure for combining atoms and expressions using rules templates.

According to one embodiment, the fraud rule templates comprise Java®-based policies with selectable parameters, for use in generating fraud rules based on specific business signatures and associated attributes. For example, using an "unusual activity" rule template, a user can build a fraud rule that comprises a business signature involving a bill pay transaction (e.g., an unusual activity) from an unusual country (e.g., an attribute of the activity). Various attributes (e.g., type of transaction, amount involved in transaction, 'from' country, 'to' country, day of transaction, etc.) of various business activities (e.g., money transfer, money withdrawal, purchase, etc.) can be used to build different fraud rules, for application against network traffic in view of customers' history of behavior. For example, using a "specific activity" rule template, a user can build a fraud rule based on the occurrence of specific activities, such as (a) if a particular activity happens, then fire rule A; (b) if a particular group of activities happens, then fire rule B; and (c) if a particular group of activities happens over a particular period of time, then fire rule C, and the like. With a "combination" rule template, a user can build a fraud rule based on fraud risk ratings associated with each of multiple "unusual" and/or "specific" activities, which when combined reach a certain threshold value which may, for example, trigger a response and/or contribute to a customer's risk rating.

According to one embodiment, fraud rule templates include the following rule templates: (a) Specific Activity for a User; (b) Specific Activity for Multiple Users; (c) Unusual Behavior for a User; and (d) Combination of Fraud Rules. The Specific Activity for a User template looks at suspicious activities that occur at real-time, and not the stored user profile summaries. For example, a fraud rule may be constructed for evaluating when a customer performing a wire transfer over $5,000. The Specific Activity for Multiple Users template can be used to check for multiple user activity with the same beneficiary within a timeframe. The template looks at activities that occur at real-time, and not the stored user profile summaries. For example, a fraud rule may be constructed for evaluating when five or more users do a bill pay to the same payee within a 24-hour period. The Unusual Behavior for a User template compares a given activity to a user's activity history to determine if it is unusual. For example, a customer logs on from an unusual country or pays a bill from an unusual ISP and City. The template relies on stored user profile summary data to check if the behavior is unusual. The Combination of Fraud Rules template can be used to check for a specific combination of activities within a certain timeframe. For example, a fraud rule may be constructed for evaluating when customers change their email address and then attempt a wire transfer within a seven-day period.

Figure 2:
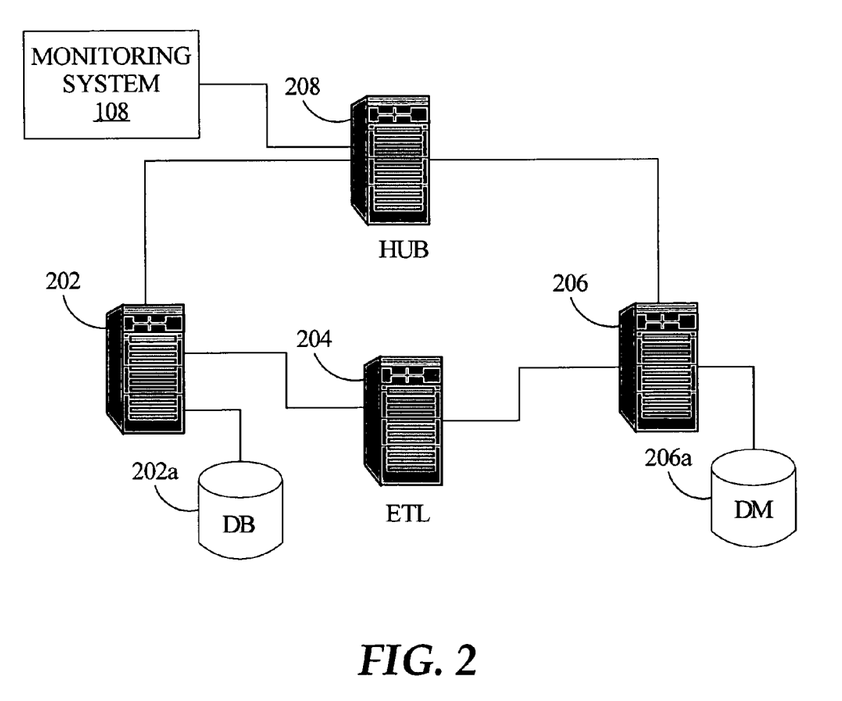
FIG. 2 is a block diagram that illustrates an operating architecture in which an embodiment of the invention may be implemented.

Fraud rules can be built based on monitoring ongoing communications between customers and network-enabled applications ("conversations") and evaluating the conversations in the context of (a) other parts of the same conversation, e.g., based on real time information stored in a cache or in database 202 (FIG. 2); (b) other ongoing conversations, e.g., based on real time information stored in a cache or database 202 (FIG. 2); (c) historical conversations, e.g., based on real time information stored in database 202 (FIG. 2); and (d) conversation summaries, e.g., based on real time information stored in fraud data mart 206 (FIG. 2).

According to one embodiment, fraud rules are denoted as being of one of two types, Suspicious Transaction Fraud Rules and Suspicious Session Fraud Rules.

A Suspicious Transaction Fraud Rule is a type of fraud rule used to look for activity in real-time, and focuses on a particular web page hit or hits within a single customer session. Customer context data may also be used in the process. Non-limiting examples include:

(a) Customer logs in from a location (ISP, country and city) from which the customer has not previously logged in;

(b) Customer logs in from a location from which the customer has not previously logged in and performs a transaction that the customer has never performed before from that location;

(c) Customer logs in from a location from which the customer has not previously logged in and performs a specific action (such as transfer over $10,000).

A Suspicious Session Fraud Rule is a type of fraud rule used to examine recent activity across many customer sessions to look for suspicious patterns. Non-limiting examples include:

(a) Customers adding the same 3rd Party Payee across many sessions;

(b) Customers paying to the same 3rd Party Payee across many sessions;

(c) Customers paying a specific payee across many sessions (i.e., where the specific payee is set as a signature attribute).

When creating a new fraud rule, "segments" of customers to which this rule applies can be selected. A "segmented" rule can be constructed such that, to qualify for the rule, customers either belong to or do not belong to one or more of the selected segments. For example, customers can be segmented based on any of the following:

(a) Marketplace, e.g., California Market, Eastern US Market, Asia Market, and the like;

(b) Account Type, e.g., Permanent Account, Basic Account, Gold Account, Silver Account, and the like;

(c) Profile-based, e.g., Frequent Travel, Spanish Speaking, and the like.

Operating Environment

Figure 1:
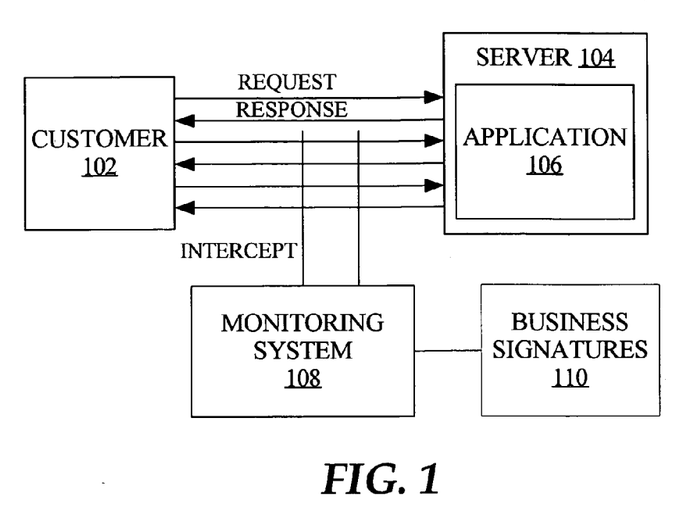
FIG. 1 is a block diagram that illustrates a simple operating environment in which an embodiment of the invention may be implemented.

FIG. 1 is a block diagram that illustrates a simple operating environment in which an embodiment of the invention may be implemented. The operating environment of FIG. 1 illustrates one of many possible environments in which the techniques described herein may be implemented.

Referring to FIG. 1, a customer 102 communicates with an application 106 executing on a server 104, such as an application server, via a network. The communications between the customer 102 and the application 104 are depicted as a series of request and response messages. A monitoring system 108 intercepts the messages, for detecting the presence of instances of predefined business signatures 110. If instances of fraud-related business signatures are detected in the messages, fraud rules relating to such business signatures are evaluated.

A form in which business signatures 110 are defined, how business signatures 110 are processed and represented for use in efficient real-time matching with monitored information, and how monitored information is processed and compared to a repository of predefined business signatures 110 to detect instances of business signatures in the monitored information, are all described in more detail in the business signatures reference in the context of general business signatures.

Architecture

FIG. 2 is a block diagram that illustrates an operating architecture in which an embodiment of the invention may be implemented. The architecture of FIG. 2 illustrates one of many possible architectures in which the techniques described herein may be implemented. FIG. 2 depicts a database 202*a* and associated database management server 202 (generally and collectively referred to as 'database 202'); an ETL (Extract, Transform, Load) server 204; an fraud data mart 206*a* and associated database management server 206 (generally and collectively referred to as 'fraud data mart 206'); and a hub server 208, each of which whose function is described in greater detail herein.

As mentioned, monitoring system 108 intercepts network traffic (e.g., request and response messages) between customers and network-enabled applications for analyzing such messages to detect the presence of instances of predefined business signatures, including signatures derived for the purpose of identifying possible fraudulent transactions with the network-enabled applications. Generally, HTTP traffic is collected by monitoring system 108, which filters the appropriate traffic (e.g., headers only, no gifs, passwords, etc.) and forwards raw data to the hub server 208 for processing/aggregation, which is described in greater detail herein.

Monitoring Network Traffic

Business signatures can be detected in a number of sources of information, through a number of mechanisms. For example, detection mechanisms include (a) interception; (b) injection; and (c) polled. Fraud monitoring may transparently monitor network traffic, for example, for anomalies in geo-location information, ISP access point information (including suspect ISPs and anonymizers), device characteristics, browser characteristics, and customer settings, on a per-customer, per session basis. The combination of device and behavioral metrics aids in avoidance of false positives, and provides a system that is resistant to session hijacking or device spoofing attacks, for example.

Information is intercepted from an interaction or communication between the application and an application user (also referred to herein as "customer"). The information may be intercepted "on the wire," such as with an interception component plugged into a network hardware component. The information may be intercepted at arrival at the application, such as with a sniffer at the application or server on which the application is executing, where the sniffer intercepts an incoming communication and diverts a copy to the monitoring system for identifying business signatures corresponding to activities of interest.

The types of information that are intercepted may vary from implementation to implementation. For non-limiting examples, HTTP (Hypertext Transfer Protocol), SMTP (Simple Mail Transfer Protocol), SNMP (Simple Network Management Protocol), OLTP (Online Transaction Processing), and/or VoiceXML over HTTP communications between the application being monitored and application users may be intercepted to identify business activities therefrom. Furthermore, either the header, payload, or both the header and the payload may be analyzed and used to identify business activities.

The monitoring system 108 continuously monitors real time HTTP traffic (or other types of network traffic). According to one embodiment, monitoring includes data collection and persistence, i.e., storage of pertinent raw data (e.g., parameter-value pairs) extracted from the messages between customers and network-enabled applications. As described in the business signatures reference, HTTP traffic data collection may involve at least the following:

(a) real time dynamic construction of customer execution paths, and monitoring associated metrics, whereby each business process execution path is based on a per-customer traversal of some or all of the links that make up a business process;

(b) dynamic extraction of business data from HTTP messages, and monitoring associated metrics;

(c) real-time extraction of basic HTTP traffic data, such as volume, faults, response times, and the like.

Metric Collection

As described in the business signatures reference, a runtime metric store (e.g., database 202) stores and manages the values of metrics collected from the HTTP traffic at run time. The metrics may include, but are not limited to the following.

(a) HTTP traffic metrics. Non-limiting examples of traffic metrics include the following:
- hit characteristics (e.g., number of hits, number of faults, etc.);
- end customer characteristics (e.g., number of registered customers, number of customers, etc.);
- session characteristics (e.g., session duration statistics, etc.); and response time characteristics.

(b) HTTP traffic metrics pertaining to, but not limited to, specific business signatures. These traffic metrics cover all metrics covered in (a), but pertaining to hits for specific business signatures identified in the traffic. For example, the metrics could be specific to all signature hits of type "site-logins", "account-lookup" or "transfer-money", etc.

(c) Content metrics, which are metrics that monitor information extracted from the HTTP message. For example, in the case of an online retail business, one could monitor the sale amount embedded in the hit of type "add-to-cart", and in the case of a bank, one could monitor the amount transferred to or from an account.

(d) Derived metrics, which are derived by evaluating expressions involving the metrics discussed in (a), (b), and (c). The ratio of the number of hits of type "add-to-cart" to the number of hits of type "login" is a non-limiting example of a derived metric.

According to one embodiment, the system monitors all HTTP traffic to a website or to a network application, effectively all the time. Real time availability of metric values for the site is critical in determining, in real-time, the possibility of fraudulent behavior regarding online transactions based on network traffic. Further, there can be thousands of metrics whose values are extracted from the HTTP traffic. This combination of a large number of metrics and real-time collection generates a large volume of data for storage in database 202.

According to one embodiment, one or more data collectors operate to collect network traffic from respective servers, server farms, or websites. The HTTP traffic is processed at the data collectors and relevant metric values are extracted. These metric values are then periodically sent to a data aggregator, which aggregates the data from all the sources and periodically stores the data in database 202. The manner in which the data aggregator receives information about the performance of various business activities may vary from implementation to implementation. For example, data collectors may be communicatively coupled to the network, or to server 104 (FIG. 1), to monitor network traffic information from which business activities can be identified via corresponding business signatures.

Extract, Transform, Load Server

ETL server 204 is a server application that is responsible for extracting new data and changes from database 202, transforming, and loading into fraud data mart 206. ETL server 204 performs the ETL processes periodically, at a frequency that is configurable via system parameters. Where ETL server 204 is configured in the system architecture may vary from implementation to implementation. For example, for testing and development purposes, ETL server 204 may reside in the same server hardware as any of the other servers (e.g., database management servers 202, 206 and hub server 208); however, for an actual deployment, ETL server 204 preferably resides in its own dedicated server because the processes performed by ETL server 204 are CPU and memory intensive.

One feature of the fraud protection system described herein, which contributes to enabling the real time analysis of vast amounts of monitored traffic data in view of fraud rules and fraud-related business signatures, is that the ETL server 204 transforms the raw data from database 202 into summary data for loading into fraud data mart 206. While the monitoring system 108 (FIG. 1) is constantly monitoring the network traffic associated with a network-enabled application, the ETL server 204 periodically, but frequently (e.g., every 3-5 minutes), performs ETL processes on the raw monitored data to modify existing summaries that are based on raw data and stored in fraud data mart 206. Whereas the raw data is relatively sparsely indexed, the summary data is relatively heavily indexed. Furthermore, the summary data is intelligently summarized for fraud protection applications, whereby data summaries can be customized for particular types of activities in certain domains (e.g., retail domain, banking domain, etc.) based on a user's domain-specific fraud rules. Consequently, the fraud data mart 206 provides rapid access to large amounts of data for analysis, both historical data monitored over time as well as the most current data. This is in part because the fraud data mart 206 is incrementally updated and, therefore, summary tables can always be queried for the most current, almost real time data.

By contrast, data marts and data warehouses generally, are typically updated in large batch processes (e.g., daily, after regular business hours), whereby the data and associated indexes are essentially recreated from scratch, rather than incrementally and almost constantly. Incremental updating of the summary data stored in data mart 206 enables accurate real time decisions about what a customer just did or is attempting to do, by detecting behavioral anomalies in real time based on historical customer profiles. This is in contrast with typical online transaction fraud protection systems, which receive their input directly and knowingly from the parties involved in the transaction, e.g., by swiping a credit card for a particular retail transaction in the case of a retail transaction or by face-to-face interactions with a bank teller in the case of banking transactions.

The fraud protection techniques described herein generally rely on non-invasive data mining from network traffic, which is unobtrusive to the transactional experience (i.e., sidestream capture and analysis of transactional data), in view of customer behavioral profiles based on a customer's transactional history with network-enabled applications. Furthermore, via a graphical interface, system users can drill down through data structures containing data about particular customers' suspicious activities and historical behavioral profile, and data about customers' activities, suspicious and otherwise, associated with a particular session with a network-enabled application.

According to one embodiment, ETL server 204 first loads slow-changing dimension tables (e.g., Country, Region, etc.), and then proceeds to loading fast-changing dimension tables (e.g., WebUser, Referer, Time, etc.) and fact tables. ETL server 204 then summarizes raw data from the fact tables, loads summaries into various summary tables, and updates any indexes on the summary tables if necessary.

Fraud Data Mart

An OLAP database (often referred to as a data mart), fraud data mart 206, is populated with business signature hit, session, and customer data. Data is extracted incrementally from the runtime OTLP data store, database 202. Fraud data mart 206 supports the complex queries executed in support of fraud rules evaluation without impacting the ability of the runtime system to acquire, process and store data from the raw HTTP traffic in real time. This "incremental extraction" means that data is moved into the fraud data mart 206 in near real time. Therefore, the fraud data mart 206 is always current and the runtime OTLP database 202 is always available for transactional data processing and storage.

Generally, the following technologies are combined to solve the real time fraud detection problem:

(a) use of real time traffic stream monitoring, business signature hit recognition, business signature hit sessionization (i.e., aggregating by session), and key hit data element extraction;

(b) real time alerts on business signature hits based on fraud rules applied to recognized hits and their key data elements and customer history from a database and/or cache;

(c) an OLAP data mart populated with ongoing incremental extraction, transformation, and loading of data from the runtime OLTP data store;

(d) near real time alerts based on fraud rules and evaluation of the data mart to detect multiple session patterns (i.e., inter-session patterns), customer behavior patterns, hit data elements, etc.

According to one embodiment, fraud data mart 206 comprises a collection of database tables containing data that has been extracted and transformed from database 202, to better support analytical SQL queries. Initially, fraud data mart 206 may be configured based on a schema that is derived from captured sessions/hits data in database 202. The fraud data mart 206 is used to identify suspicious transactions or hits, based on a set of fraud rules or policies that are executed in hub server 208 for every relevant business signature hit.

It is preferable that fraud data mart 206 does not co-reside with the database 202 because the analytical queries issued against the fraud data mart 206 are typically very expensive and could impact the performance of the database 202 and, consequently, the performance of the business signatures management/monitoring infrastructure. Further, the storage requirements and management for the fraud data mart 206 are different from the database 202. For example, the database 202 is configured to maintain a stable size by purging old data (e.g., keeping only months of data) whereas the data mart 206 space usage stores years of data.

According to one embodiment, the fraud data mart 206 is configured as a collection of star schemas that share common dimension tables and in which the fact table of one star schema can reference another fact table in another star schema (e.g., for drill-down or drill-across purposes). The fraud data mart 206 is generic and granular in order to preserve the ability to query at individual signature hit, session, or customer levels. The database schema for the fraud data mart 206 allows for rapidly storing the network traffic data that has been matched against business signatures. The schema enables storage of a vast amount of data representing customer activity and behavior, which is efficiently accessible in real time by the rules processing engine to determine if a current activity is unusual for a customer or if patterns are detected in recent activity. For example, the fraud data mart 206 schema may include dimensions such as activity (e.g., login), customer, region, country. According to one embodiment, the fraud data mart 206 schema includes summary tables for storing historical data by customer, such as data regarding maximum, minimum, and average fund transfer amounts, most frequent login locations, and the like.

Hub Server

The hub server 208 matches network traffic metrics from monitoring system 108 against business signatures 110 (FIG. 1), and aggregates traffic metrics. The hub server 208 forwards the traffic metrics, i.e., pertinent raw data (e.g., parameter-value pairs), to the database 202. In addition, the hub server 208 captures session related data and, if appropriately configured, stores them in the database 202.

Additionally, hub server 208 evaluates fraud rules via a rules processing engine, which involves checking business signature hits against summarized historical data stored in fraud data mart 206. Stated otherwise, in response to identifying from the network traffic the performance of a particular business activity by a particular customer, based on a particular business signature, hub server 208 evaluates a set of one or more fraud rules that identify the particular business signature, to determine whether any conditions specified in the fraud rules are satisfied in view of historical summary information stored in fraud data mart 206. If the conditions specified in any of the fraud rules are satisfied, then hub server 208 determines how to respond to the fraud rule hit, e.g., do nothing, generate an alert, generate a fraud risk rating, interdict the transaction, and the like.

According to one embodiment, the rules processing engine manages a cache of recent network traffic that has been matched against business signatures. This cache allows the rules engine to be triggered when a particular activity (e.g., fund transfer) occurs and to efficiently investigate other activities that happened in the same session and/or happened within the last few hours. Evaluation of a pertinent rule can determine whether the combination of activities is suspected fraud. This caching technique is far more scalable than querying a database for the data. Essentially, the rules are evaluated over a data stream in memory rather than a database.

Alerts

Evaluation of fraud rules can generate alerts, which may be associated with a corresponding risk rating. Alerts and risk ratings may be associated with particular business activities (e.g., based on corresponding business signatures), a particular customer user, and/or particular customer sessions. According to one embodiment, a user interface to the fraud protection system is provided, which displays summary information about suspect activities detected on websites being monitored. Once suspicious transactions have been flagged, users can drill down into the specific details of that session via the user interface. For example, according to one embodiment, users can drill down on customers' business activities to see a list of alerts and/or a list of alerts per rule and/or a list of alerts per business signature, and the like. Furthermore, the user interface can be used to display groupings of customers by their corresponding risk ratings based on open alerts (i.e., alerts corresponding to activities for which there remains uncertainty regarding fraud). Hence, the fraud protection system enables users to track, capture, and analyze customer sessions, both individually and en masse, based at least in part on the information stored in the summary tables of fraud data mart 206 (FIG. 2). Users can follow a single customer's path through a complex, multi-step business process. Customer sessions can be replayed or compared with similar sessions to quickly identify whether or a not a suspicious activity is truly fraudulent.

According to one embodiment, for risk assessment purposes, a tiered risk scoring system is used to handle potentially fraudulent online activity in order to minimize impact on customer behavior through challenges and alternate channels, as follows:

(a) yellow flag for a transaction: the transaction is considered "possibly risky" and is simply sent to an early detection system such as the user interface, so there is no change to the online business process and no customer impact, and if an abnormal number of these alerts are detected as compared with the norm, additional procedures or notification steps can be invoked;

(b) orange flag for a transaction: the transaction is considered "probably risky" and a "challenge" can be invoked in real time to clear transaction, such as requiring the customer to repeat authentication or to pass a more stringent authentication requirement;

(c) red flag for a transaction: the transaction is considered "very risky" and an online interdiction can be invoked in real-time, e.g., the customer has to call a different channel to continue with the transaction or the customer is blocked from performing the suspect activity until the transaction can be reviewed and/or approved by a person.

The fraud protection system described herein can be used as an early detection system and for direct intervention to help block and prevent fraudulent activities. For example, two mechanisms can be used to enable true real-time interdiction capabilities with the network-enabled application: (1) suspicious activity events can be sent to the network-enabled application proactively with the risk rating of the event; and (2) a Web Services API can be used by the network-enabled application to call into the fraud protection system and request a yellow/orange/red risk flag for a transaction before letting it through in the OLTP business process.

Detecting Possible Fraudulent Activities with a Network-Enabled Application

Figure 3:
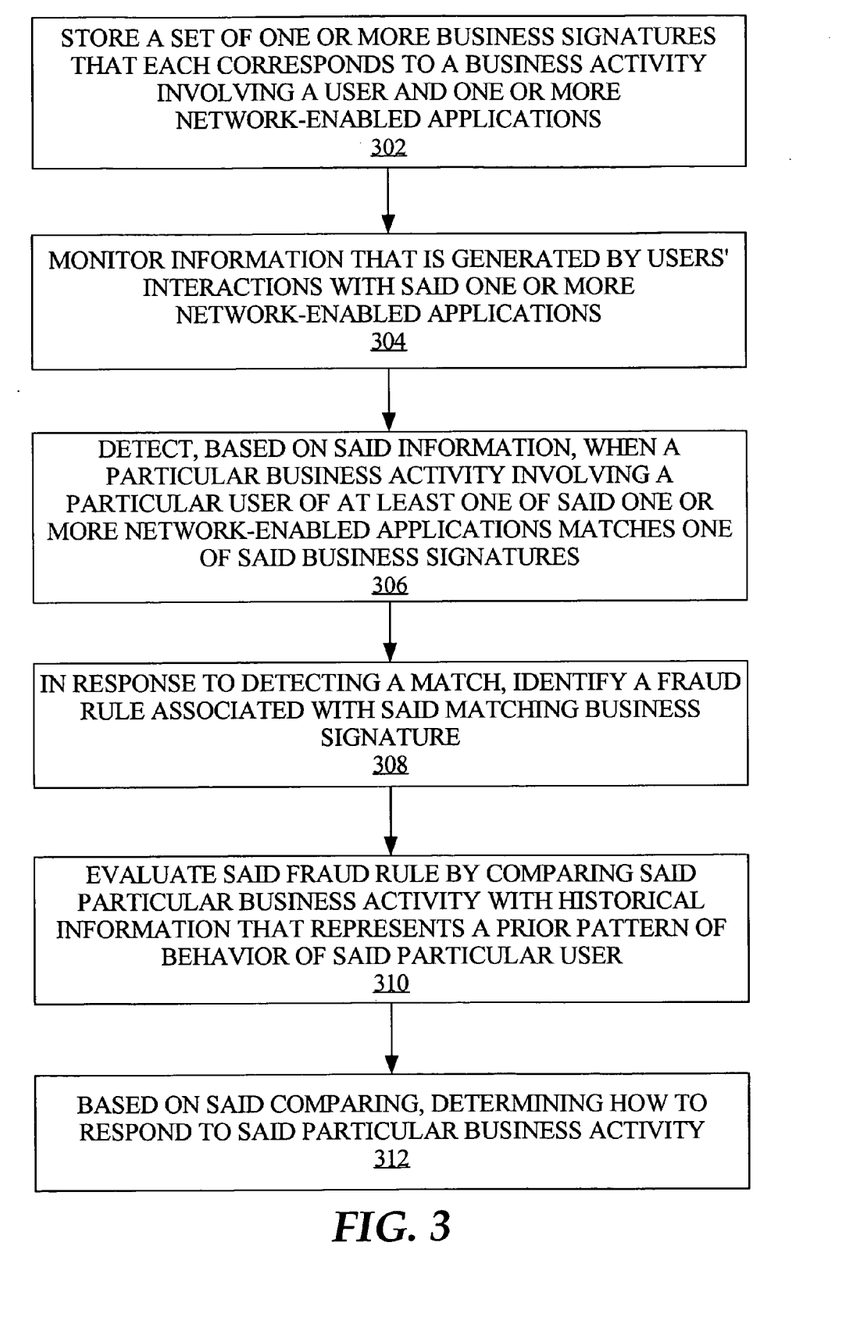
FIG. 3 is a flow diagram that illustrates a method for detecting possible fraudulent activities with a network-enabled application, according to an embodiment of the invention.

FIG. 3 is a flow diagram that illustrates a method for detecting possible fraudulent activities with a network-enabled application, according to an embodiment of the invention. The method depicted in FIG. 3 may be implemented as software, i.e., as sequences of instructions which, when executed by one or more processors, cause the processors to perform certain method steps. If implemented as software, the sequences of instructions are executed on one or more computers or machines, such as computer system 400 of FIG. 4. Alternatively, the method depicted in FIG. 3 may be implemented as hardware-embedded code or a combination of hardware and software.

At block 302, a set of one or more business signatures is stored, where each business signature corresponds to a business activity involving a user and one or more network-enabled applications. For example, business signatures 110 (FIG. 1) are stored for efficient access by monitoring system 108 (FIG. 1). For a non-limiting example, particular fraud-related business signatures may characterize (a) a client-server communication event representing a transfer of money of a certain amount between accounts (e.g., transfer amount >$10,000) and characterize (b) a location of the client machine from which the client-server communication originated (e.g., client machine has an IP address allocated to a network located in Nigeria).

At block 304, information that is generated by users' interactions with the one or more network-enabled applications is monitored. For example, monitoring system 108 (FIG. 1) monitors the request/response communications between one or more customer 102 (FIG. 1) and application 106 (FIG. 1) executing on server 104 (FIG. 1), and routes such monitored information through hub server 208 (FIG. 2) for eventual storage in database 202 (FIG. 2), as described in greater detail herein.

At block 306, it is detected when a particular business activity that involves a particular user and one of the network-enabled applications matches one of the stored business signatures. For example, hub server 208 (FIG. 2) matches a stored business signature with an atom of the network traffic conversation, which is considered a business signature hit. For example, based on the monitored traffic from monitoring system 108 (FIG. 2), hub server 208 detects that Customer X is attempting to perform a transaction, from an IP address associated with a network in Nigeria (i.e., a match with business signature (b)), which transfers $20,000 to another bank account (i.e., a match with business signature (a)).

At block 308, in response to detecting a business signature(s) at block 306, a fraud rule is identified which is associated with the matching business signature(s). For example, hub server 208 (FIG. 2) identifies a particular stored fraud rule that includes a condition based on business activities that correspond to one or more of the stored business signatures. For example, based on detection (e.g., at block 306) of the transaction involving Customer X attempting to transfer $20,000 to another bank account from an IP address associated with a network in Nigeria, hub server 208 accesses a repository of stored fraud rules to identify a particular fraud rule that indicates that if more than $10,000 is transferred to another account using a machine in Africa then compare this activity with Customer X's prior patterns of behavior relating to this network-enabled application, before allowing the transaction to complete.

At block 310, the fraud rule identified at block 308 is evaluated in the context of the particular business activity, by comparing the particular business activity with historical information that represents a prior pattern of behavior of the particular customer user. For example, hub server 208 (FIG. 2) queries fraud data mart 206 (FIG. 2) for the current (i.e., near real time) summary information that corresponds to Customer X's prior transactional behavior relating to the network-enabled application or, for example, relating to the entire web site through which the network-enabled application is hosted. As mentioned, querying the fraud data mart 206 may be performed after first checking a cache for most recent business activity information identified as interesting by matching with corresponding business signatures.

For example, hub server 208 evaluates the particular fraud rule regarding a transfer of more than $10,000 to another account using a machine in Africa, in view of Customer X's transfer of $20,000 to another bank account from an IP address associated with a network in Nigeria and in view of the prior patterns of behavior of the particular customer user. For example, Customer X's pattern of behavior based on prior interactions with the network-enabled application is to almost always log onto the system from an American-based network address, but never from an African country. Therefore, the transfer transaction under scrutiny is somewhat suspicious in view of Customer X's prior activities. For another example, Customer X's pattern of behavior based on prior interactions with the network-enabled application is to almost never transfer sums of money exceeding a few thousand dollars at a time. Therefore, the transfer transaction under scrutiny is somewhat suspicious in view of Customer X's prior activities.

In the case of a fraud rule constructed to apply to a customer segment, hub server 208 evaluates such a rule in view of the behavior of the specified customer segment rather than (or in addition to) in view of the behavior of a particular customer user. For example, in trying to protect against fraudulent account openings, in a scenario in which there is no behavioral history for a particular customer or for the particular customer's performance of a particular activity, hub server 208 evaluates the fraud rule by investigating the customer segment that consists of account openings and compares the behavior of the particular customer to that of the customer segment.

At block 312, based on the evaluation of block 310, it is determined how to respond to the particular business activity that was matched with the business signatures at block 306. For non-limiting examples, a response may include generating a fraud risk rating for the transaction, generating and issuing an advisory alert associated with the transaction, realtime interdiction, secondary authorization, human review, and the like.

The simple scenario described in reference to the method depicted in FIG. 3 is for purposes of example. The business signatures and fraud rules may be much more complex than those used in the example scenario and, therefore, may vary from implementation to implementation.

Hardware Overview

Figure 4:
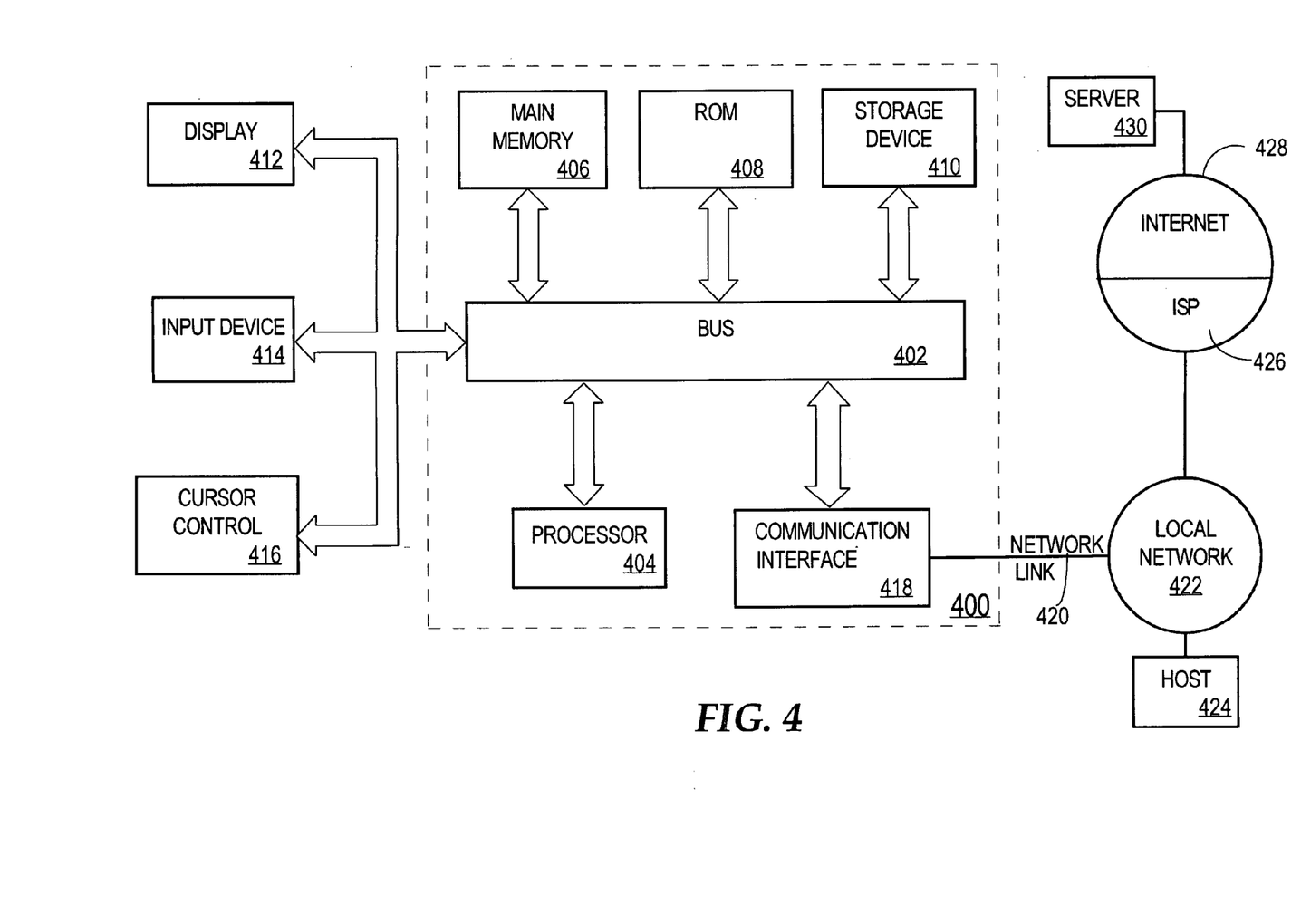
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Embodiments of the invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    storing a set of one or more business signatures, wherein each business signature specifies a pattern that indicates a business activity involving a user and one or more network-enabled applications;
    monitoring information that is generated by at least a particular user's interactions in a particular session with said one or more network-enabled applications;
    detecting, based on said information, that a particular business activity, in the particular session, involving the particular user of at least one of said one or more network-enabled applications matches a particular signature of said set of one or more business signatures;
    in response to said detecting that the particular business activity matches the particular signature, performing:
        identifying a fraud rule associated with the particular signature;
        evaluating said fraud rule, wherein the evaluating of the fraud rule is based on historical information that represents a prior pattern of behavior of said particular user prior to said particular session; and
        based on said evaluating, determining to respond to said particular business activity in a first manner responsive to the fraud rule being satisfied and in a second manner responsive to the fraud rule not being satisfied, wherein the first manner is different than the second manner;
    wherein at least the steps of monitoring, detecting, and evaluating are performed by one or more computing devices.

2. The method of claim 1, wherein the first manner comprises one or more of:
    generating an alert associated at least with said particular business activity;
    generating a fraud risk rating associated with said particular business activity;
    generating a fraud risk rating associated with said particular user.

3. The method of claim 1, wherein the second manner comprises performing no additional action in response to the particular business activity matching the particular business signature.

4. The method of claim 1, wherein the pattern of behavior of said particular user prior to said particular session is a pattern of activities that are similar to the particular business activity being performed by said particular user during the particular session.

5. The method of claim 1, wherein the pattern of behavior of said particular user prior to said particular session is a pattern of activities performed by said particular user during one or more sessions with the one or more network-enabled applications prior to the particular session with the one or more network-enabled applications.

6. The method of claim 1,
    wherein said monitoring comprises:
        generating, based on said information, first data regarding the particular user's interactions in the particular session with said one or more network-enabled applications;
        storing said first data in a first database;
    wherein the method further comprises:
        transforming the first data stored in said first database into summary data; and
        storing said summary data
            as part of historical information to be used for evaluation of said fraud rule during a session after the particular session.

7. The method of claim 6, further comprising:
    in response to storing said summary data, updating one or more indexes that index said one or more summary tables if the one or more indexes are affected by said summary data.

8. The method of claim 1, further comprising:
    in response to said detecting, storing first data in a cache, wherein said first data is generated based on said information and said first data is regarding said particular business activity in the particular session;
    wherein said evaluating comprises comparing said particular business activity in the particular session with second data stored in said cache, wherein the second data is different than the first data.

9. The method of claim 8, wherein said second data comprises data generated based on monitored information regarding other business activities performed with said one or more network-enabled applications during one or more sessions prior to said particular session.

10. The method of claim 1,
    wherein the pattern indicating the business activity is a pattern in network traffic;
    wherein monitoring the information comprises monitoring network traffic; and
    wherein detecting that the particular business activity matches the particular signature comprises detecting the pattern in the network traffic.

11. The method of claim 1, further comprising:
    generating summary profile data for the particular user based on monitored information from the particular user's interactions in one or more sessions prior to the particular session with said one or more network-enabled applications;

wherein detecting that the particular business activity matches the particular business signature is performed in real-time or near real-time relative to the particular business activity, during the particular session, but subsequent to generating the summary profile data;

wherein the historical information upon which evaluation of the fraud rule is based is the summary profile data.

12. One or more non-transitory computer-readable storage media storing instructions that, when executed by one or more computing devices, cause performance of:

storing a set of one or more business signatures, wherein each business signature specifies a pattern that indicates a business activity involving a user and one or more network-enabled applications;

monitoring information that is generated by at least a particular user's interactions in a particular session with said one or more network-enabled applications;

detecting, based on said information, that a particular business activity, in the particular session, involving the particular user of at least one of said one or more network-enabled applications matches a particular signature of said set of one or more business signatures;

in response to said detecting that the particular business activity matches the particular signature, performing:
identifying a fraud rule associated with the particular signature;
evaluating said fraud rule, wherein the evaluating of the fraud rule is based on historical information that represents a pattern of behavior of said particular user prior to said particular session; and
based on said evaluating, determining to respond to said particular business activity in a first manner responsive to the fraud rule being satisfied and in a second manner responsive to the fraud rule not being satisfied, wherein the first manner is different than the second manner.

13. One or more non-transitory computer-readable storage media as recited in claim 12, wherein the first manner comprises one or more of:
generating an alert associated at least with said particular business activity;
generating a fraud risk rating associated with said particular business activity;
generating a fraud risk rating associated with said particular user.

14. One or more non-transitory computer-readable storage media as recited in claim 12, wherein the second manner comprises performing no additional action in response to the particular business activity matching the particular business signature.

15. One or more non-transitory computer-readable storage media as recited in claim 12, wherein the pattern of behavior of said particular user prior to said particular session is a pattern of activities that are similar to the particular business activity being performed by said particular user during the particular session.

16. One or more non-transitory computer-readable storage media as recited in claim 12, wherein the pattern of behavior of said particular user prior to said particular session is a pattern of activities performed by said particular user during one or more sessions with the one or more network-enabled applications prior to the particular session with the one or more network-enabled applications.

17. One or more non-transitory computer-readable storage media as recited in claim 12, wherein the instructions, when executed by one or more computing devices, cause monitoring by:

generating, based on said information, first data regarding the particular user's interactions in the particular session with said one or more network-enabled applications;

storing said first data in a first database;

wherein the instructions, when executed by one or more computing devices, further cause performance of:

transforming the first data stored in said first database into summary data; and storing said summary data as part of historical information to be used for evaluation of said fraud rule during a session after the particular session.

18. One or more non-transitory computer-readable storage media as recited in claim 17, wherein the instructions, when executed by one or more computing devices, further cause performance of:
in response to storing said summary data, updating one or more indexes that index said one or more summary tables if the one or more indexes are affected by said summary data.

19. One or more non-transitory computer-readable storage media as recited in claim 12, wherein the instructions, when executed by one or more computing devices, further cause performance of:
in response to said detecting, storing first data in a cache, wherein said first data is generated based on said information and said first data is regarding said particular business activity in the particular session;
wherein said evaluating comprises comparing said particular business activity in the particular session with second data stored in said cache, wherein the second data is different than the first data.

20. One or more non-transitory computer-readable storage media as recited in claim 19, wherein said second data comprises data generated based on monitored information regarding other business activities performed with said one or more network-enabled applications during one or more sessions prior to said particular session.

21. One or more non-transitory computer-readable storage media as recited in claim 12,
wherein the pattern indicating the business activity is a pattern in network traffic;
wherein monitoring the information comprises monitoring network traffic; and
wherein detecting that the particular business activity matches the particular signature comprises detecting the pattern in the network traffic.

22. One or more non-transitory computer-readable storage media as recited in claim 12, wherein the instructions, when executed by one or more computing devices, further cause performance of:
generating summary profile data for the particular user based on monitored information from the particular user's interactions in one or more sessions prior to the particular session with said one or more network-enabled applications;
wherein detecting that the particular business activity matches the particular business signature is performed in real-time or near real-time relative to the particular business activity, during the particular session, but subsequent to generating the summary profile data;
wherein the historical information upon which evaluation of the fraud rule is based is the summary profile data.

* * * * *